United States Patent

[11] 3,582,568

[72] Inventor Itsuki Ban
No. 829, Higashi,Oizumi-Machi, Nerima-ku, Tokyo, Japan

[21] Appl. No. 752,846
[22] Filed Aug. 15, 1068
[45] Patented June 1, 1971
[32] Priority Aug. 17, 1967, Sept. 26, 1967
[33] Japan
[31] 42/52428 and 42/61430

[54] TAPE QUICK FEED MEANS FOR A SOUND REPRODUCING APPARATUS UTILIZING A MAGNETIC ENDLESS TAPE
7 Claims, 7 Drawing Figs.

[52] U.S. Cl. .......... 179/100.2, 179/100.1, 318/327
[51] Int. Cl. .......... G11b 15/52, G05b 11/01, H02p 7/40
[50] Field of Search .......... 179/100.10 (C), 100.1 (S), 100.10 (C), 100.2 (S), 100.3 (D); 318/327; 1/1v (C); 340/148

[56] References Cited
UNITED STATES PATENTS

| | | | |
|---|---|---|---|
| 3,402,257 | 9/1968 | Delange | 179/100.2 |
| 3,233,163 | 2/1966 | Mishima | 318/327 |
| 2,606,253 | 8/1952 | Somers | 179/100.1 |

*Primary Examiner*—Bernard Konick
*Assistant Examiner*—Raymond F. Cardillo, Jr.
*Attorney*—Morgan, Finnegan, Durham & Pine

ABSTRACT: Tape feeding means for a sound reproducing apparatus that utilizes a magnetic endless tape driven by a motor whose rotary shaft serves as the capstan drive for the apparatus. A governor controls the rotation of the motor such that the tape can be fed either at a normal rated speed or at a high speed, depending upon whether or not the governor has been actuated. Circuitry is provided to sense a nonrecorded zone on the tape and thus to automatically cause the governor to switch into its operative condition to change the rate of speed of the tape from a high rate of speed to a normal rate of speed.

INVENTOR
ITSUKI BAN
BY Morgan, Finnegan, Durham & Pine
ATTORNEY

INVENTOR

ITSUKI BAN

BY

Morgan, Finnegan, Durham & Pine

ATTORNEY

TAPE QUICK FEED MEANS FOR A SOUND REPRODUCING APPARATUS UTILIZING A MAGNETIC ENDLESS TAPE

BACKGROUND OF THE INVENTION

The present invention relates to a recording-reproducing apparatus utilizing a magnetic tape and more specifically to means for controlling the tape speed.

There are currently available endless tape cartridges which can be used either in a data storage or a musical recorded and/or recording capacity.

The tape cartridges of the above-mentioned classes utilize a tape that has a plurality of distinct sound tracks upon which there is recorded a variety of programs such as music or the like. Selection of a track can be readily and instantaneously effected by altering the spacial relationship between the tape and the magnetic head. It is, however, impossible to select a desired single program from a plurality of programs recorded laterally upon a track of the tape. In order to pick out or select one program out of a plurality of recorded programs on a track, it is necessary to rewind the tape and then feed the tape at a speed greater than its normal playing and/or recording speed so as not to waste time. To reduce the period of time required for selecting a particular program recorded upon an endless tape, the apparatus must be capable of quickly feeding the tape until that portion of the tape upon which the desired program was recorded is reached since the mechanism of an endless tape cartridge prevents rewinding of the tape.

An additional problem arises when an endless tape mechanism is utilized as described above; namely, that the tape within the endless tape mechanism is subject to entanglement and backlash if there is a sudden change in the rate of movement of the tape. For this reason, a conventional mechanism for quick tape feeding cannot be utilized with an endless tape recording-reproducing apparatus.

The above-mentioned problems are solved by the present invention by utilizing a motor as the drive source for a capstan drive member, the motor being capable of releasing a governor from its engagement so as to increase its speed of rotation and thus effect a high tape feeding rate of from 4 to 10 times as fast as the normal rate of tape feed utilized during recording and/or play back of the tape. The switch over of the tape feed from its normal speed to its high speed, in accordance with the invention, is affected within approximately the same period of time as that required when switching back from high speed to normal speed and, additionally, avoids having the tape backlash or become entangled. In keeping with the invention, the proposed device utilizes unrecorded zones between recorded programs on the tape as a means for indicating to a sensor that separate programs do in fact exist upon the tape. By having the rate of tape feed change from the high rate to the normal or rated rate when the sensor indicates an unrecorded zone on the tape, an operable sound reproducing apparatus capable of practically utilizing a magnetic endless tape is achieved.

SUMMARY OF THE INVENTION

The primary object of the invention is to provide a quick tape feeding means for a recording-reproducing apparatus that utilizes a magnetic endless tape wherein a high tape transport speed is achieved by releasing a motor from the control of a governor to thereby increase the rotation of a capstan and thereafter the tape is reduced to a normal or rated rate of speed by reducing the rate of rotation of the motor in response to the actuation of the governor.

A further object of the invention is to provide a quick tape feeding means of the above character which is capable of terminating the high speed of the tape upon the detecting of an unrecorded zone on the tape.

Another object of the invention is to provide a quick tape feeding means in which the tape is switched from its high rate of speed to its normal or rated rate of speed within a short period of time by electromagnetically controlling the motor so that reduction of the rotation of the motor's rotor is quickly affected.

Still another object of the invention is to provide a quick tape feeding means which is capable of limiting speaker input to prevent an unnecessary recorded sound from being reproduced during high tape transport speeds.

A still further object of the invention is to provide a quick tape feeding means which enables a rotary shaft of the motor to serve as a capstan.

Further objects and additional features of the invention will become apparent from the following detailed description and annexed drawings, wherein:

DESCRIPTION OF THE PREFERRED EMBODIMENTS

Figure 1:
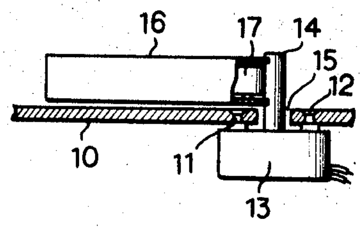
FIG. 1 is a side elevational view of a magnetic endless tape running apparatus with a portion thereof being broken away.

Referring now to FIG. 1, numeral 10 indicates a deck upon which a magnetic endless tape cartridge 16 and under which a motor 13 is mounted by means of bolts or screws 11 and 12. The deck 10 is provided with an aperture 15 from which a shaft 14 of the motor projects. A pinch roller 17 received in the cartridge 16 urges the tape against the shaft 14 through the leading edge window formed in the cartridge. The shaft 14 may serve as a capstan so that the magnetic tape can be fed when the shaft is rotated to coact with pinch roller 17.

In view of the fact that the shaft of the motor 14 functions as the capstan, the rate of rotation of the capstan is relative to the rate of rotation of the shaft of the motor and is caused to be in the range of 5 to 7 r.p.s. when the tape feed is at normal or rated speed. This is one-fifth to one-tenth of the rate of rotation of the motor of this class. For this reason, a governor assembly is required, and, for this size of motor, such an assembly is preferably electrical rather than mechanical in operation. When the motor 13 is rotated in disengagement of the electronic governor, the rate of rotation thereof will be increased from 5 to 10 times its normal rate so as to allow the tape to be fed as quickly as possible.

Figure 2:
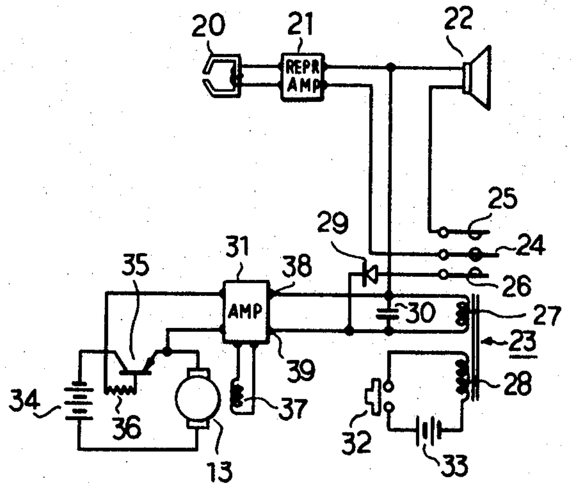
FIG. 2 is a block schematic diagram of a circuit for controlling high tape feed.

A block diagram shown in FIG. 2 is one form of a circuit for controlling the rate of rotation of motor 13 so as to obtain a quick tape transport in accordance with the invention.

Referring to FIGS. 1 and 2, a magnetic head 20 comes into a slidable contact with the tape through the leading edge window of the cartridge 16. The output of the head 20 is applied as an input to a reproducing amplifier 21 while the output of the amplifier 21 is applied to a speaker 22 through changeover contacts 24 and 25 of an electromagnetic relay 23. Upon actuation of the relay 23, a portion of the output signal of amplifier 21 is impressed across exciting coil 27 of the relay 23 through the contacts 24 and 26, a diode 29, and a condenser 30 while the remainder of the output signal is applied to an amplifier 31 in an electronic governor circuit for the motor 13.

Relay 23 is also provided with a second exciting coil 28 to which a power source 33 is connected through a pushbutton switch 32. With this arrangement, temporary depression of switch 32 causes coil 28 to be energized and relay 23 to attract the actuator thereof (not shown) at which time the contacts 24 and 26 are closed so that the output of the amplifier 21 is converted to a DC current by the diode 29 and condenser 30 and is then drained into coil 27 to thereby allow the relay 23 to be self-retained in operative condition. At the same time, the speaker 22 is, therefore, deenergized as contacts 24 and 25 are opened.

The motor 13 is supplied through a transistor 35 of the electronic governor with armature current from a power source 34. The base of the transistor 35 is connected through a bias resistance 36 to the output terminal of the amplifier 31 in the electronic governor circuit while the emitter of the transistor 35 is directly connected thereto. A pickup coil 37 generates an electromotive force in response to the rate of rotation of motor 13 and this output is applied to amplifier 31 in the electronic governor circuit. That is to say, when an electromotive force is applied to amplifier 31, it represents a deviation from a reference rate of rotation and is allowed to be a feedback to the transistor 35 so that the speed of the motor 13 is controlled. Application to terminals 38 and 39 of amplifier 31 of an average current from the output of amplifier 21 allows the output to take a direction where the transistor 35 is energized so that the motor 13 is released form the control of rotation thereof and is, therefore, fully rotated.

In operation with respect to the circuit as shown in FIG. 2, when relay 23 is deenergized, the changeover contacts 24 and 26 are away from each other so that the output of reproducing amplifier 21 is not applied to amplifier 31 of the electronic governor circuit thus causing motor 13 to rotate at normal speed due to the fact that the rotation of motor 13 is being controlled by the governor circuitry of the device. As a result, the endless tape is fed at normal speed to effect the aural play of the tape. At this point, temporary depression of pushbutton switch 32 causes the current from the power source 33 to be applied to the exciting coil 28 of the relay 23 causing relay 23 to become actuated and to disconnect contacts 24 and 25 from each other so that disconnection between the amplifier 21 and the speaker 22 is established. Meanwhile, the current is drained into the exciting coil 27 by means of the output signal from the reproducing amplifier 21 and the relay 23 is held in an operative position. The output signal is, thus, applied to the terminals 38 and 39 through the changeover contacts 24 and 26 to energize the transistor 35 and thus cause motor 13 to rotate at high speed as motor 13 is then released from its governing circuitry. In other words, the tape is now fed at a high rate.

With this in mind, backlash of the tape is avoided since rotation of the rotor of the motor 13 is not made abruptly. For instance, when a recorded program is played and a nonrecorded zone on the tape has reached the head, the output signal of amplifier 21 decays and the current drain on the coil 27 is broken while the relay 23 is restored to its normal position so that the electronic governor of the motor 13 is energized to feed the tape at the normal speed. Subsequent to this, the changeover contacts 24 and 25 are closed to cause the speaker 22 to produce sound. Depending on the length of the nonrecorded zone on the tape, it is necessary that the condenser 30 and the resistance of the coil 27 be adjusted to form a proper delay circuit for preventing the relay 23 from reactuating when an interval between the recorded informations exists on the tape. A semiconductor switching circuit may be substituted as the changeover circuit for the regenerative output signal, that is, electromagnetic relay 23, since such a circuit would achieve the same result as that of the relay 23.

A remarkable advantage in this operation is as follows. If a program is started during the play cycle, and one does not desire to listen to that particular program, pushbutton switch 32 may be depressed to obtain high tape feed and to cause the aural signal of such a program to be deactuated from speaker 22. After completion of such program in this manner, the tape is again fed at normal speed so that the next program appearing upon the tape can be heard. For this reason, a desired program can be performed automatically in a repeated manner.

Figure 3A:
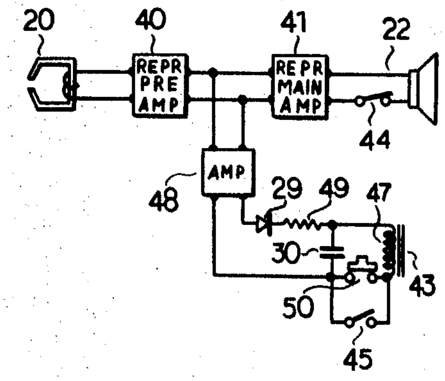
FIG. 3A is a schematic diagram of a circuit for tape reproduction and for high feed self-control.
Figure 3B:
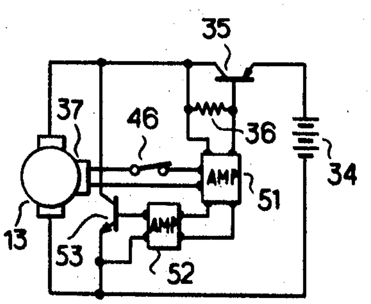
FIG. 3B is a schematic diagram of a circuit for motor speed switchover.

Referring to FIGS. 3A and 3B wherein like parts are designated by like numerals, the embodiment to be described is for the purpose that rotation of the motor 13 is quickly reduced when the high tape feed rate is converted to the normal feed rate. According to the arrangement illustrated in FIG. 2, the rotation of the motor 13 is slowly reduced when such conversion is made so that the next program appearing on the tape must always be heard in the midportion thereof. The output of the magnetic head 20 is obtained in the form of an aural signal which is applied to speaker 22 through a reproducing preamplifier 40, reproducing main amplifier 41 and normally closed contact 44 of electromagnetic relay 43. Some of the output of the preamplifier 40 is applied to an exciting coil 47 through amplifier 48, diode 29, resistor 49, condenser 30, and normally closed contact 45 of relay 43 or pushbutton switch 50.

The circuit in FIG. 3A illustrates the tape being fed at normal speed and the contact 44 being closed to obtain the sound for speaker 22. Upon depression of the pushbutton switch 50, the output signal of the reproducing preamplifier which has been amplified by the amplifier 48 is varied to direct current by the diode 29, condenser 30 and is applied to the coil 47 to actuate the relay 43 whereby the contact 44 is opened while the contact 45 is closed. Upon the closing of contact 45, relay 43 is self-retained and the pushbutton switch 50 can be released from its depression. Upon the opening of contact 44, the output signal is disconnected from speaker 22. So long as the output signal of the amplifier 40 is generated, relay 43 is maintained active; however, when the output signal of the amplifier 40 decays, there is no current to be drained into the coil 47 so that relay 43 is returned to its nonoperative condition whereby the contact 45 is opened to open the self-retained circuit.

The motor 13 is supplied with the current from the power source 34 through the transistor 35. The output of the pickup coil 37 which generates a voltage in response to the rate of rotation of motor 13, is impressed upon the base circuit of the transistor 35 through a normally closed contact 46 and amplifier 51. Some of the output from amplifier 51 is further amplified by the amplifier 52 and is applied to the base circuit of the transistor 53 which is connected in parallel with the armature coil of the motor 13. When the contact 46 is closed, the output of the amplifier 51 increases the base voltage of the transistor 35 in response to a quickened rotation of motor 13. Accordingly, the resistance between the emitter and collector of the transistor is increased causing a reduction in the armature current of the motor 13 and thus governing the rotational rate of motor 13 by causing the motor to rotate at its normal rate. Additionally, the output of amplifier 52 affects the base control for the transistor 53.

On the other hand, when the input of the amplifier 51 is nil by opening the contact 46 due to actuation of the electromagnetic relay 43, the base voltage of the transistor 35 is dropped to allow the current to be applied through the resistor 36 between the emitter and base so that the resistance between the emitter and collector is reduced to the extent whereby the voltage of the power source 34 is directly impressed to the motor 13 to cause the latter is rotated at high speed. In this connection, the output of the amplifier 52 is nil and deactuates transistor 53. Next, when the electromagnetic relay 43 is held in nonoperative condition and the contact 46 is closed, the output of the amplifier 51 is magnified in response to the increased number of rotations of the motor 13. Thus, the transistor 35 is deenergized while the transistor 53 is energized by the output current of amplifier 52 which occurs when rotation of the motor 13 is greater than the rating rotation thereof. This causes the armature of motor 13 to be short circuited. The motor is thus affected by this electromagnetic control and its rate of rotation is rapidly reduced. Rotation of the motor within the range of control by the electronic governor energizes the transistor 53. Thereafter, the motor 13 is affected by the governor control and is rotated at normal speed to allow the tape to be fed at normal speed.

It can be seen from the foregoing that when a certain program is played and the regenerative output exists, if the pushbutton switch 50 is once depressed, the electronic governor is deenergized and the motor will rotate at high speed to allow the tape to be quickly fed while the regenerative sound from the speaker 22 is interrupted. Now, when the regenerative output signal is interrupted for a certain period by a nonrecorded zone appearing on the track of the tape, the electromagnetic relay 43 is released from self-retaining to actuate the electronic governor and the transistor 53 short circuits the armature to rapidly reduce the rate of rotation of motor 13 so as to cause the tape to be fed at normal speed thus allowing the audio signal to be applied to speaker 22. The circuit described hereinbefore is similar to that shown in FIG. 2 in that if there is any recorded program which is undesired to be played, it can be indexed by feeding the tape at its high speed upon the depression of pushbutton switch 50.

Figure 4:
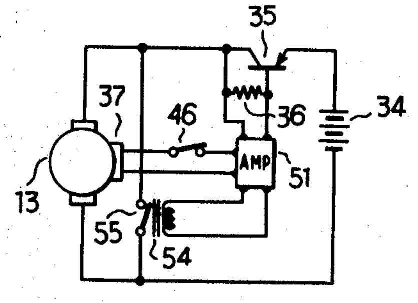
FIG. 4 is a block wiring diagram showing a form in which the motor shown in FIG. 3B is electromagnetically controlled by an electromagnetic relay.

The electromagnetic relay 54 shown in FIG. 4 is used in place of the transistor 53 of the FIG. 3B. The contact 55 of relay 54 short circuits the armature of motor 13 to rapidly reduce the rate of rotation of motor 13. In FIG. 4, like parts are designated by like numerals. The electromagnetic relay 54 is supplied with current by amplifier 51 when contact 46 is closed and motor 13 is rotating at a speed faster than its normal speed. The actuation of relay 54 causes contact 55 to close and thus short circuit the armature of motor 13. When motor 13 is rotated at normal speed and contact 46 is opened, the electromagnetic relay 54 is deactuated. From the foregoing, it should readily be understood that the circuit illustrated in FIG. 4 shows an operation similar to that of the circuit of the FIG. 3B.

Figure 5:
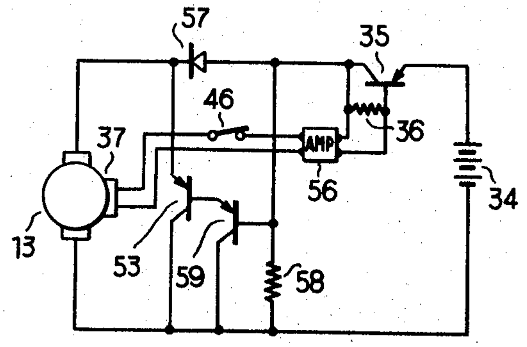
FIG. 5 is a modified form of the circuit shown in FIG. 3B.

FIG. 5 shows a modified form of the circuit of the FIG. 3B and like parts are indicated by like numerals.

Numeral 56 designates an amplifier which functions in a manner identical to amplifier 51 as described hereinbefore. The amplifier 56 is actuated to increase the base voltage of transistor 35 so as to increase the resistance between the emitter and collector for the transistor when the rotation of motor 35 is quickened and the output voltage of the pickup coil 37 is high. Thus, the motor 13 at the time when the contact 46 is closed, is rotated at normal speed since the motor is controlled by the governor under operation of amplifier 56 and transistor 35. Such a rate of rotation (rated tape feed speed) causes the diode 57 to be supplied with a current in a normal direction. Some current passing through the transistor 35 from power source 34 is shunted through resistor 58 to increase the base voltage of transistor 59. As a result, both transistors 53 and 59 are held in a cutoff condition.

Upon the opening of contact 46, the input of amplifier 56 is nil and the base voltage of transistor 35 is decreased so that the resistance between the emitter and collector of transistor 35 is greatly reduced and power source 34 is thus directly applied to motor 13 to allow the motor to be rotated at speeds of from 4 to 5 times faster than normal. This is what is called "quick or high tape transport." At the stage of such quick or high tape feed, when contact 46 is closed, the output of amplifier 56 is extremely magnified since the number of rotations of motor 13 is large so that transistor 35 becomes nonconductive causing power source 34 to be disconnected from the armature of motor 13. Accordingly, the voltage on the anode of diode 57 is reduced to nil and the base voltage of transistor 59 is also reduced thus enabling the electromotive force of the armature coil of the motor 13 to be short circuited via transistor 53 resulting in the consumption of the rotational energy of motor 13 so that the number of rotations thereof is decreased. Thus, when the number of rotations of motor 13 reaches the range for control by the electronic governor, the transistor 35 is energized while transistors 59 and 53 are deenergized whereby motor 13 is caused to rotate at normal speed under control of the electronic governor. It is not always necessary to use the transistor 59, however, when used, transistor 59 will cause the resistance of transistor 53 in the normal condition to be reduced so as to build up the electromagnetic control operation.

A circuit to search that the rotation of motor 13 reaches a rated speed, comprises transistor 59 which breaks the electromotive power of the armature coil by means of the diode, the resistor 58 incorporated in the base circuit, and the transistor 35. It may readily be understood that transistor 35 serves to search the above-mentioned phase and which functions as the governor operation. However, the aforementioned search operation can be affected by any other means such as an electromagnetic relay in place of transistors 59 and 35, and resistor 58.

Figure 6:
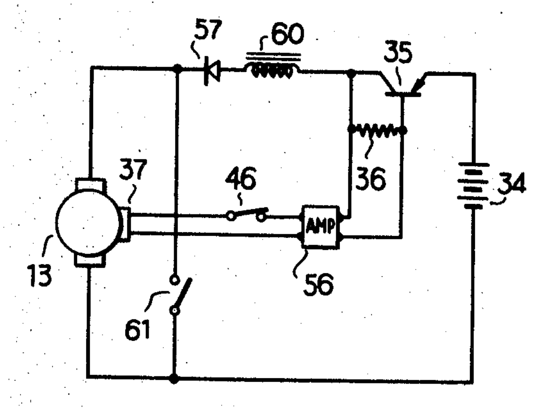
FIG. 6 is a block wiring diagram showing a form in which the motor shown in FIG. 5 is electromagnetically controlled by an electromagnetic relay.

FIG. 6 shows a preferred embodiment in this connection. In FIG. 6, like parts are indicated by like numerals of FIG. 5. The output of the amplifier 56 may be applied to the opposite ends of the resistor 36 for the base circuit of the transistor 35 when the contact 46 is closed as described hereinbefore with respect to FIG. 5. Therefore, control of rotation of the motor is affected in the same manner as in FIG. 5. An electromagnetic relay 60 is inserted between the diode 57 and the transistor 35 and the contact 61 of the relay is to be opened when the relay 60 is energized. The contact 46 is opened to bring motor 13 into the quick or fast tape feed condition at the time the transistor 35 is energized so that the relay 60 is also energized. Next, contact 46 is closed, the large output of the electronic governor flows through resistor 36 to deenergize transistor 35 so that relay 60 is no longer energized. Thus, contact 61 is closed to short circuit the electromotive power of the armature of motor 13 which in turn causes the electromagnetic force to rapidly reduce the rate of rotation of the rotor of the motor. At this point, the diode 57 breaks the electromotive force so as not to affect relay 60 thereby. In this manner, when motor 13 is drawn to normal rotation, transistor 35 is rapidly drawn into initiation. As a result, the current from the power source 34 is applied through relay 60 and diode 57 to the armature so that relay 60 is actuated and contact 61 is opened to rotate motor 13 at normal speed under operation of the electronic governor. In this case, the means by which the motor starts normal rotation, comprises relay 60, diode 57 and transistor 35, the transistor 35 functioning as in the embodiments hereinbefore discussed.

In FIG. 3 to FIG. 6, contact 46 is opened and closed in response to actuation and deactuation of relay 43 to determine the speed of motor 13. However, if the recorded program selection is desired to be manual rather than automatic, a conventional changeover switch, a pushbutton switch or a relay that has operatively no connection with the reproduced output signal, may be used to affect high tape feed or normal tape feed. That is to say, the normal tape feed occurs when the contact is closed and high tape feed occurs when the contact is opened.

As described in the above, according to the present invention, the tape transport at high or normal speed is readily and automatically affected so that the tape can be conveniently used for wide purposes.

Although the invention has been described with reference to specific means for practicing the invention, it is apparent that many modifications may be made by one skilled in the art, and accordingly, it is intended that the scope of the invention be limited only as defined in the following claims.

I claim:

1. A control circuit for switching the rate of feed of tape in a sound reproducing system from a governed rate to a high speed rate and back again, comprising:

a. a motor driven tape feeding means;
b. an electrical source for energizing said motor;
c. a solid state device coupled between said motor and said source for controlling the flow of current from said source to said motor:
d. means for varying the conductive state of said solid state device to cause said sound reproducing system to switch from said governed rate to said high speed rate and to automatically return to said governed rate in response to the absence of a prerecorded signal on the tape, said means comprising;

i. a first sensing element coupled to said motor for generating a signal in proportion to the rotational rate of said motor;
ii. a second sensing element coupled to the tape for generating a signal from prerecorded portions of the tape as the tape is being fed within the sound reproducing system;
iii. circuit means for normally controlling said solid state device in accordance with the signal generated by said first sensing element to achieve tape feed at a governed rate; and
iv. circuit means connected to said solid state device for controlling the same to achieve a high speed rate in response to an initial manual actuation and maintaining the high speed rate until said second sensing element ceases to generate a signal.

2. A control circuit as described in claim 1 wherein said solid state device is a transistor.

3. A control circuit as described in claim 1 additionally comprising means for decoupling the speaker of the sound reproducing system from said prerecorded signal on said tape when said motor is energized at its high speed rate.

4. A motor control circuit for switching the rotational rate of a motor utilized to drive tape within a sound reproducing system from a governed rate to a high speed rate and back again, comprising:

a. a motor driven tape feeding means;
b. an electrical source for energizing said motor;
c. a solid state device coupled between said motor and said source for regulating the flow of current from said source to said motor;
d. means for varying the conductive state of said solid state device to cause said motor to switch from the governed rate to the high speed rate and to automatically return to the governed rate in response to the absence of a prerecorded signal on the tape, said means comprising:
i. a first sensing element coupled to said motor for generating a signal in proportion to the rotational rate of said motor;
ii. circuit means for normally controlling said solid state device in accordance with the signal generated by said sensing element to achieve tape feed at a governed rate;
iii. switching means coupled between said sensing element and said circuit means for selectively coupling said sensing element to said solid state device during the governed rate of rotation of the motor;
iv. a second sensing element coupled to the tape for generating a signal from prerecorded portions of the tape as the tape is being fed within the sound reproducing system;
v. actuating network for causing said switching means to open upon the manual actuation of said actuating network to achieve said high speed rate, said switching means remaining open until said second sensing element ceases to generate a signal, whereupon said switching means closes and said system returns to a governed rate; and e. shunting means coupled across said motor to short said motor and thus achieve breaking of said motor, said shunting means being actuated when said switching means closes in response to the absence of a signal from said second sensing element and said shunting means being actuated only until said governed rate is achieved.

5. A motor control circuit as described in claim 4 wherein said shunting means is an electromagnetic relay.

6. A motor control circuit as described in claim 4 wherein said shunting means is a solid state device.

7. A motor control circuit as described in claim 6 further comprising a diode coupled between said solid state device and said motor, said diode disposed to prevent the generative electromotive power of the motor from affecting the conductive state of said solid state shunting device.